United States Patent Office 3,228,760
Patented Jan. 11, 1966

3,228,760
METHOD OF TEMPERING BY HEAT TREATING VITREOUS SILICA
Kenneth Henderson Jack, Cullercoats, North Shields, and John Alexander Winterburn, Tynemouth, North Shields, England, assignors to The Thermal Syndicate Limited, Northumberland, England, a British company
No Drawing. Filed Aug. 24, 1962, Ser. No. 219,125
8 Claims. (Cl. 65—32)

This invention relates to a method of stressing the surface of a sample of vitreous silica, having particular application in regard to transparent vitreous silicas which possess a strong absorption band in the infrared at a wavelength of 2.73 microns.

Much work has been carried out on the annealing processes applicable to ordinary glasses and there are several semi-empirical relationships between variables which are sufficiently accurate when applied to glasses to provide the required results. On the basis of such generalisations, transparent vitreous silica should be the glass most easily annealed, but in practice this is not found to be the case.

The application of schedules currently used to provide fine annealing of homogeneous transparent vitreous silica, not being infrared absorptive, provide unsatisfactory results. The birefringence caused by residual strain remaining in material of these grades after conventional annealing schedules can be reduced to a tolerable level (8 millimicrons/cm.) by using a cooling rate much slower than normal, but even so, an excessive variation of refractive index remains across the block. This change in refractive index has now been found to be caused by loss of constituent water, present as hydroxyl groups, from the surface of the material during the heat treatment, which loss results in a corresponding change in composition varying from the centre to the edge of a block of material. This loss of constituent water is particularly severe in the annealing range.

According to the invention a method of stressing a sample of vitreous silica comprises heating the sample in an atmosphere having a partial pressure of water vapour which is in marked dis-equilibrium with the constituent water content of the sample.

A measure of the water content of a sample of vitreous silica may be obtained from the intensity of the absorption band at a wavelength of 2.73 microns. Thus to stress a sample of vitreous silica in accordance with the invention having no detectable absorption band at a wavelength of 2.73 microns, the sample should be heated in an atmosphere rich in water vapour or rich in compounds which at the stressing temperature would dissociate or combine to form water vapour.

Where the sample of vitreous silica to be stressed has a strong absorption band at a wavelength of 2.73 microns (i.e. an optical density at this wavelength of between 1.2 and 1.5 per mm.), the stressing should be carried out in a dry atmosphere or an atmosphere free from compounds which would dissociate of combine to form water-vapour at the stressing temperature.

By purposely maintaining the water vapour content of the ambient atmosphere surrounding a vitreous silica charge in marked disequilibrium with the constituent water content of the vitreous silica during heating of the material, pieces of vitreous silica can be formed in which, as a result of strains which are set up in the outer layers of the material, the outer layers are in compression or in tension. For "toughening" glasses the desired condition is a surface layer in compression.

By heating samples of vitreous silica for a limited time in an atmosphere having a partial pressure of water vapour markedly smaller than that corresponding at that temperature to the initial water content of the silica, strains can be obtained in the surface layers which are in compression when the heat treatment temperature is above the strain point and which are in extension when the heat treatment temperature is below the strain point.

Conversely, the directions of the strains developed by these heat-treatments can be reversed by heating in an atmosphere having a partial pressure of water vapour markedly larger than that corresponding at that temperature to the initial water content of the silica.

The rate at which diffusion of water into the bulk of the material occurs increases with temperature. Thus at temperatures below the strain point the time of heat treatment can be greater than for temperatures above the strain point, the desired effect still being produced in the surface layers of the material.

The following examples illustrate these principles:

*Example 1*

A sample of vitreous silica having a high constituent water content (i.e. that grade of transparent vitreous silica known under the registered trade mark "Spectrosil") was heated for several hours at 1000° C. a substantially dry atmosphere. On cooling to room temperature a compressive strain was seen to have been developed in the surface of the sample.

*Example 2*

A sample of vitreous silica having a moderate constituent water content was heated at a temperature of 1000° C. for several hours in an atmosphere with a partial pressure of water vapour greater than that corresponding, at that temperature, to the initial constituent water content of the silica. On cooling to room temperature an extensive strain was found to have been developed in the surface layers of the sample.

*Example 3*

A sample of vitreous silica having a negligible constituent water content was heated at 850° C. in an ambient atmosphere of pure steam for a period of 18 hours. On cooling to room temperature the sample was found to have developed compressive strain in the surface layers.

To obtain compressive strain in the surface layers of a sample of vitreous silica by the employment of this invention it is necessary to limit the removal or addition of water vapour to the surface layers of the material.

From the foregoing it will be appreciated that the temperature and partial pressure of water vapour in the atmosphere at which heat treatment of vitreous silica is carried out are both critical parameters.

What is claimed is:

1. In a process of annealing vitreous silica, the method of stressing a body of vitreous silica, comprising the steps of determining the water content of said body of vitreous silica; subjecting said body of vitreous silica to heating at annealing temperature and thereafter to cooling to a substantially lower temperature; and simultaneously controlling the water content of the ambient atmosphere so that the partial water vapor pressure in said ambient atmosphere is smaller than that required for equilibrium, at said annealing temperature, with said determined water content of said body of vitreous silica, whereby strains are obtained at the surface layer of said body of vitreous silica which are in compression when said annealing temperature is above the strain point and which are in extension when said annealing temperature is below the strain point of said body.

2. In a process of annealing vitreous silica, the method of stressing a body of vitreous silica, comprising the steps of determining the water content of said body of vitreous silica; subjecting said body of vitreous silica in a closed vessel to heating at annealing temperature and thereafter to cooling to a substantially lower temperature;; simultaneously controlling the water content of the atmosphere in said closed vessel so that the partial water vapor pressure in said ambient atmosphere is smaller than that required for equilibrium, at said annealing temperature, with said determined water content of said body of vitreous silica; and terminating said annealing before equilibrium between said water content of the atmosphere and said constituent water content of said body of vitreous silica has been established, whereby strains are obtained at the surface layer of said body of vitreous silica which are in compression when said annealing temperature is above the strain point and which are in extension when said annealing temperature is below the strain point of said body.

3. In a process of annealing vitreous silica, the method of stressing a body of vitreous silica, comprising the steps of determining the water content of said body of vitreous silica; subjecting said body of vitreous silica to annealing within an elevated temperature range of between 850° C. and 1000° C. and thereafter to cooling to a substantially lower temperature and simultaneously controlling the water content of the ambient atmosphere so that the partial water vapor pressure in said ambient atmosphere is smaller than that required for equilibrium, at said elevated temperature, with said determined water content of said body of vitreous silica.

4. In a process of annealing vitreous silica, the method of stressing a body of vitreous silica having substantially no absorption band at a wave length of 2.73 microns, comprising the steps of subjecting said body of vitreous silica to annealing within an elevated temperature range of between about 850° C. and 1000° C. and thereafter to cooling to a substantially lower temperature while said body of vitreous silica is located in a substantially pure steam atmosphere; and terminating said annealing while there is still substantial disequilibrium between said pure steam atmosphere and the constituent water content of said vitreous silica, whereby strains are obtained in the surface layer of said body of vitreous silica which are in extension when said elevated temperature is above the strain point and which are in compression when said elevated temperature is below the strain point of said body of vitreous silica.

5. In a process of annealing vitreous silica, the method of stressing a body of vitreous silica having at a wave length of 2.73 microns an optical density of between 1.2 and 1.5 per millimeter, comprising the steps of subjecting said body of vitreous silica to annealing within an elevated temperature range of between about 850° C. and 1000° C. and thereafter to cooling to a substantially lower temperature while said body of vitreous silica is located in a substantially dry atmosphere; and terminating said annealing while there is still substantial disequilibrium between said dry atmosphere and the constituent water content of said vitreous silica, whereby strains are obtained in the surface layer of said body of vitreous silica which are in compression when said elevated temperature is above the strain point and which are in extension when said elevated temperature is below the strain point of said body of vitreous silica.

6. In a process of annealing vitreous silica, the method of stressing a body of vitreous silica, comprising the steps of determining the water content of said body of vitreous silica; subjecting said body of vitreous silica to heating at annealing temperature and thereafter to cooling to a substantially lower temperature; and simultaneously controlling the water content of the ambient atmosphere so that the partial water vapor pressure in said ambient atmosphere is greater than that required for equilibrium, at said annealing temperature, with said determined water content of said body of vitreous silica, whereby strains are obtained at the surface layer of said body of vitreous silica which are in extension when said annealing temperature is above the strain point and which are in compression when said annealing temperature is below the strain point of said body.

7. In a process of annealing vitreous silica, the method of stressing a body of vitreous silica, comprising the steps of determining the water content of said body of vitreous silica; subjecting said body of vitreous silica in a closed vessel to heating at annealing temperature and thereafter to cooling to a substantially lower temperature; simultaneously controlling the water content of the atmosphere in said closed vessel so that the partial water vapor pressure in said ambient atmosphere is greater than that required for equilibrium, at said annealing temperature, with said determined water content of said body of vitreous silica; and terminating said annealing before equilibrium between said water content of the atmosphere and said constituent water content of said body of vitreous silica has been established, whereby, strains are obtained in the surface layer of said body of vitreous silica which are in extension when said annealing temperature is above the strain point and which are in compression when said annealing temperature is below the strain point of said body.

8. In a process of annealing vitreous silica, the method of stressing a body of vitreous silica, comprising the steps of determining the water content of said body of vitreous silica; subjecting said body of vitreous silica to annealing within an elevated temperature range of between 850° C. and 1000° C. and thereafter to cooling to a substantially lower temperature; and simultaneously controlling the water content of the ambient atmosphere so that the partial water vapor pressure in said ambient atmosphere is greater than that required for equilibrium, at said elevated temperature, with said determined water content of said body of vitreous silica.

References Cited by the Examiner

UNITED STATES PATENTS

| 176,066 | 4/1876 | Rogers | 65—117 |
| 2,982,053 | 5/1961 | Elmer | 65—30 XR |

OTHER REFERENCES

The Proceedings of the Physical Society, vol. 54, part 5, September 1, 1942, No. 305, pages 391 to 404.

HOWARD R. CAINE, *Acting Primary Examiner.*

DONALL H. SYLVESTER, *Examiner.*